United States Patent
Romero et al.

(10) Patent No.: US 8,122,264 B2
(45) Date of Patent: Feb. 21, 2012

(54) POWER-STATE CHANGE AS A FUNCTION OF DIRECTION OF RIGHT-TO-USE STATUS CHANGE

(75) Inventors: Francisco Romero, Richardson, TX (US); Thomas L. Vaden, Bridgewater, NJ (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1633 days.

(21) Appl. No.: 11/408,377

(22) Filed: Apr. 22, 2006

(65) Prior Publication Data

US 2007/0250731 A1 Oct. 25, 2007

(51) Int. Cl.
*G06F 1/00* (2006.01)
*G06F 1/32* (2006.01)

(52) U.S. Cl. ........ 713/300; 713/320; 713/323; 713/324; 705/59

(58) Field of Classification Search ................ 713/300, 713/320, 323, 324; 705/59
See application file for complete search history.

(56) References Cited

U.S. PATENT DOCUMENTS

| | | | |
|---|---|---|---|
| 6,476,797 B1* | 11/2002 | Kurihara et al. | 345/173 |
| 6,859,792 B1* | 2/2005 | Marjadi et al. | 705/59 |
| 7,428,645 B2* | 9/2008 | O'Connor et al. | 713/300 |
| 7,433,257 B2* | 10/2008 | Yamagami | 365/226 |
| 2003/0135580 A1 | 7/2003 | Camble et al. | |
| 2004/0249763 A1 | 12/2004 | Vardi | |
| 2005/0198399 A1* | 9/2005 | Stancil | 709/249 |
| 2005/0215274 A1* | 9/2005 | Matson et al. | 455/522 |
| 2005/0235137 A1* | 10/2005 | Barr et al. | 713/1 |
| 2006/0028896 A1* | 2/2006 | Yamagami | 365/226 |
| 2006/0173730 A1* | 8/2006 | Birkestrand | 705/10 |
| 2007/0150713 A1* | 6/2007 | Almeida et al. | 713/1 |
| 2007/0174411 A1* | 7/2007 | Brokenshire et al. | 709/213 |

* cited by examiner

*Primary Examiner* — Kim Huynh
*Assistant Examiner* — Michael J Brown

(57) ABSTRACT

The present invention provides a computer-implemented limited right-to-use business method. In response to a command to change the right-to-use status of at least a first component, the right-to-use status of said processor is changed in a direction either from reserved to available or from available to reserved. Then, the power state of the component can be changed as a function of that direction.

14 Claims, 2 Drawing Sheets

POWER-STATE CHANGE AS A FUNCTION OF DIRECTION OF RIGHT-TO-USE STATUS CHANGE

BACKGROUND OF THE INVENTION

Herein, related art is discussed to aid in understanding the invention. Related art labeled "prior art" is admitted prior art; related art not labeled "prior art" is not admitted prior art.

Many computer institutional and other customers want to obtain sufficient computing power for their present and short term computing demands, and sufficient expandability and upgradeability to meet projected longer-term demands. Several computer resource vendors have addressed this need using a "right-to-use" business model in which a customer purchases a pre-expanded system with right-to-use limits. For example, a customer needing thirty-two processors in the short term with expandability to sixty-four processors long term, might purchase a sixty-four processor system with rights to use thirty-two of the processors. Likewise, the right-to-use business model can permit other computer components, e.g., memory, input/output devices, and storage.

Typically, all processors are active, but the operating system monitors and enforces the right-to-use limits by withholding computer threads from the excluded processors. A customer requiring more performance can obtain (e.g., purchase) an authorization; when the operating system accepts this authorization, it simply starts allocating threads to previously excluded processors.

In one refinement of this "limited right-to-use" business model, a customer can purchase rights to use in advance and the operating system can debit the pre-purchased rights as they are used. Another refinement is to allow a customer to reallocate resources (e.g., across hard partitions of a server) by deciding which processors are to be used and which excluded. With these refinements, the limited right-to-use business model affords customers a lower initial cost plus the ability to respond practically instantly to changes in demand by reallocating and adding resources. As a result, this right-to-use business model is becoming more widely adopted, so that further competitive refinements are eagerly sought.

BRIEF DESCRIPTION OF THE DRAWINGS

The following drawings are of embodiments/implementations of the invention and not of the invention itself.

DETAILED DESCRIPTION

In the course of the present invention, it was recognized that the limited right-to-use business model needed to be modified to better accommodate customer's economic and ecological interests in reducing energy consumption. Processor manufacturers have addressed reducing power consumption by designing processors (e.g., Pentium and Itanium, available from Intel Corporation) that can assume different power states including low-power reduced performance states and state-data-preserving "sleep" states, the latter coming in variants that do and those that do not reboot to assume an active state. Computer system builders have taken advantage of these different states by building in utilities that allow customers to set power states manually or to set utilization criterion for automatically changing power states. However, none of these approaches are optimized for computers subjected to use limitations. The present invention refines the right-to-use business model by coordinating right-to-use status with power states as described below.

Figure 1:
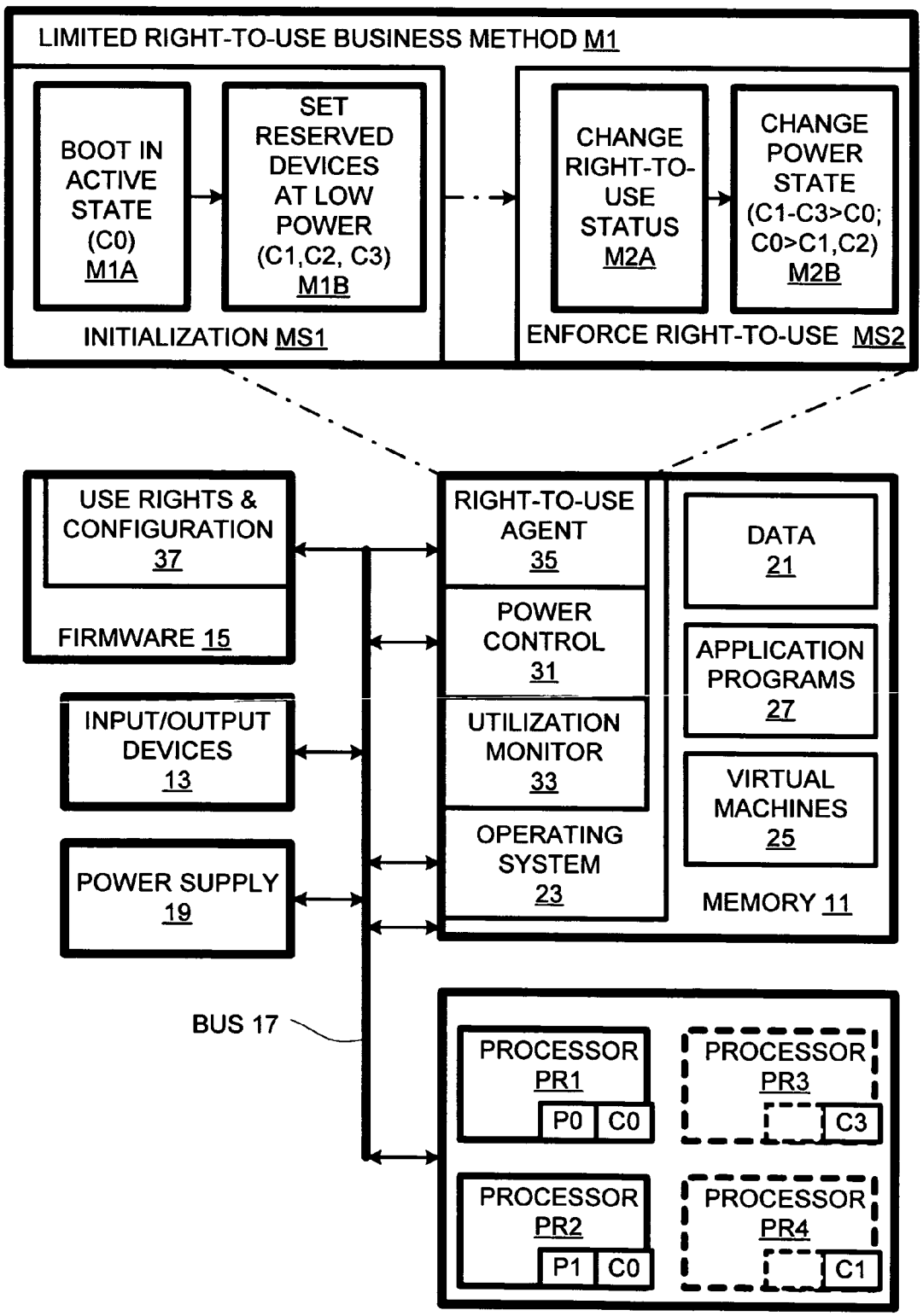
FIG. 1 schematically represents a server system, a method, and a program on computer-readable media in accordance with a first embodiment of the invention.

A server system AP1 embodying the present invention includes processors PR1-PR4, memory 11, input/output (I/O) devices 13, firmware 15, a bus 17, and a power supply 19, as shown in FIG. 1. Memory 11 encompasses both solid-state memory and disk storage. While server system AP1 is a server, i.e., a computer that provides services to other computers, the invention applies as well to other types of computers. Also, different embodiments of the invention include different numbers of processors, different amounts and arrangements of memory, I/O devices, and firmware. Also, the invention can apply in a multi-computer environment such as a large-scale data center.

Note that this description makes references to states defined in "Advanced Configuration and Power Interface Specification" (ACPI) promulgated by Hewlett-Packard Corporation, Intel Corporation, Microsoft Corporation, Phoenix Technologies Ltd., and Toshiba Corporation, Revision 3.0, Sep. 2, 2004, particularly pages 13-23. The ACPI specification defines global power states G0-G3, device states D0-D3, and processor states C0-C3. In addition, there are "sleeping" states with state G1 and performance level states P0, and P1-Pn within device state D0 and processor state C0. Not all systems, devices, and processors have all states. Systems, devices, and processors not necessarily conforming to the ACPI standard, often have analogous states.

In the ACPI processor power state C1, the operating system is asked to deactivate a processor. It does that by removing it from scheduling computational and I/O work and then gives it to firmware for the firmware to put the processor in a lower power state, e.g., a the HALT_LIGHT state for an Itanium processor (available from Intel Corporation). For activation, the operating system sends an interrupt to the processor to be activated. This wakes the processor out of HALT_LIGHT but in the control of firmware. The firmware returns the processor back to the operating system. Then the operating system allows computational and I/O work to be scheduled for the newly activated processor.

Memory 11 stores data 21 and programs, including an operating system 23, virtual machines 25, and application programs 27. In other embodiments, virtual machines are not used; for example, all application programs can run directly on operating system 23. Operating system 23 encompasses utilities and agents including a power-control utility 31, a utilization monitor 33, and a right-to-use agent (RTU) 35. Power control utility 31 allows a user to set power levels for server AP1 globally (e.g., global ACPI states G0-G3) or on a component-by-component (e.g., ACPI processor states C0-C3 and P0-Pn, and device states D0-D3) basis. Power control utility 31 also lets the user select power profiles for automatically setting power levels based on utilization data gathered by utilization monitor 33. Finally, power control utility 21 is responsive to commands from RTU agent 35 to set power levels.

The function of RTU agent 35 is quite distinct from the functions of power control utility 31 and utilization monitor 33. RTU agent commands power control utility 31 to set certain performance-versus-power levels, not in response to manual commands or in response to actual utilization, but as a function of the terms of a right-to-use business agreement. Thus, a component that is fully utilized might have its rightto-use changed to reserved under the right-to-use limitations and thus have its power state reduced. Likewise, a reserved component that becomes available under the right-to-use limitation can have its power state raised, regardless of the utilization levels of other components. In this case, right-to-use agent 35 asks operating system 23 to activate a component; operating system 23 then has firmware 15 set the higher state. Of course, once active, a component can have its power state regulated in response to utilization monitor 33.

RTU agent 35 determines rights to use from right-to-use and configuration data 37 stored in a non-volatile rewritable flash memory of firmware 15. RTU agent 35 can read and write to this flash memory, which is not user accessible. The use data 37 specifies the number of available and reserved components, instant activation privileges, authentication codes, and pre-purchased temporary utilization rights. RTU agent 35 reads this use data 37 and ensures that computer processes are not allocated to reserved processors. While this description focuses on the processor power states, RTU agent 35 similarly enforces right-to-use limitations on other components, including memory modules and I/O devices that have programmable power states.

In FIG. 1, by way of example, processors PR1 and PR2 are "available", while processors PR3 and PR4 are "reserved", as indicated in dash. Processor PR1 is in state C0, which is fully operational and at sub-state P0, which is the maximum performance state. Processor PR2 is in state C0, but in sub-state P1, which is a reduced frequency state. This state may have been entered according to a customer selected utilization profile.

Processors PR3 and PR4 were booted up in state C0 so that it can assume a state known to operating system 23; then RTU agent 35 sets them to power state C3 to save power while maintaining their states. State C3 uses the minimum power sufficient to preserve cache data, but takes the longest time to return to an active state. In state C3, cache data is preserved, but snoops are ignored. As long as these processors are not used to run programs, this is acceptable. However, in the event a processor is temporarily activated, it may be set to a power state that permits snooping, such as C1 or C2. Alternatively, the same low-power state can be used for both initial and subsequent inactivations, e.g., state C1 can be used for all reserved processors to minimize activation latency.

Processor PR4 is shown at power state C1 instead of C3. In the interim, it was temporarily made available under the right-to-use limitations by agent 35. When the period for availability expired, agent 35 set the reserve power state to C1 so that its cache, which was then full, could be snooped and so that any further activation would be more instantaneous. Alternatively, agent 35 can be configured to set a power state C2 upon deactivation following temporary activity.

RTU agent 35 implements a business method M1, flowcharted at the top of FIG. 1, with an initialization method segment MS1 and a right-to-use change method segment MS2. While the following characterization of method M1 focuses on controlling processors, it provides as well for controlling other components such as memory modules, I/O devices, and storage devices according to their right-to-use provisions.

Initialization method segment MS1 method begins with a step M1A of booting both available and reserved processors, as defined by the right-to-use limitations, in performance mode. In the ACPI standard (see below), this would be state C0, typically, sub-state P0. However, other performance states such as P1 might be used. For example, if when the system was last shut down, low utilization was anticipated after the next boot, then server AP1 could have been configured to start up at a lower chip frequency, e.g., as associated with state C0, P1. Booting is typically controlled by firmware 15, first by itself, and then in collaboration with software as it is loaded.

Once the operating system 23 is running, RTU agent 35 can check use rights and configuration data 37 in firmware 15 to identify processors that are "reserved" in that their use rights are limited. Then, RTU agent 35 causes the state of each reserved processor to be set to a lower but data-preserving power state so that, upon command, it can resume activity without requiring a reboot. More specifically, RTU agent 35 commands operating system 23 to reserve processors; operating system 23 has firmware 15 set the lower state. In the illustrated embodiment, the lower power state can be C1, C2 or C3. As in the illustrated embodiment, the reserve power state can differ between processors that have not been temporarily activated and those that have. In other embodiments not conforming to ACPI, functionally similar power states are achieved. In alternative embodiments, other states can be used such as a relatively lower power active state, e.g., P3 of state C0.

Once initialization is complete, RTU agent 35 continues to enforce right-to-use limitations at method segment MS2. In embodiments where the reserved processors are in a non-dormant state (e.g., C0, P3), RTU agent 35 can withhold processes from reserved processors. During method segment M2, one or more commands to change the right-to-use status of a processor may be received. For example, a command to activate a reserved processor can result from: 1) a purchase of a permanent or temporary right to use that processor: 2) from automatic activation of a reserved processor with pre-paid temporary activation rights; or 3) from an authorized resource allocation in which one processor's activation is offset by another processor's deactivation. Conversely, a command to deactivate a processor (i.e., set it to reserve status) can reflect the end of a period of temporary activation or a reallocation of resources in which the given processor is deactivated to allow another to be activated.

Note that right-to-use limitations can vary. For example, some may allow all reserved processors to be temporarily activated, while others may allow a subset of reserved processors to be temporarily activated. In the latter case, RTU agent 35 can appropriately limit temporary activations.

In response to such a command, RTU agent 35 changes the right-to-use status of the subject processor, e.g., by updating use rights and configuration data 37 at step M2A. Once the status has been updated, RTU agent 35 commands power control 31 to change the power state of the subject processor as a function of the direction of the status change at step M2B. If the change was from reserved to available, the power state can be changed from C3, C2, or C1 to C0. If the change was from available to reserved, the power state change can be from C0 to C1 or C2.

The global states are relevant to embodiments of the invention in which right-to-use limits apply to systems or hard partitions. The device states can apply to I/O devices, including adapters that interface with external devices. Global states G1 and G2, device states D1-D3, and processor states C1-C3 are useful low-power states in the context of the invention. Where these are unavailable or impose unacceptable latencies, low-power performance states P1-Pn (where n is an integer greater than 1) can be used.

In the case of a processor, the low-power state can be C1, as it provides low power with the lowest latency for instant-on purposes. If high latencies are acceptable, states C2 and C3 can be used. However, processor state C3 precludes cache snooping, and so may be inappropriate for processors deactivated after a post-initialization temporary activation.

Figure 2:
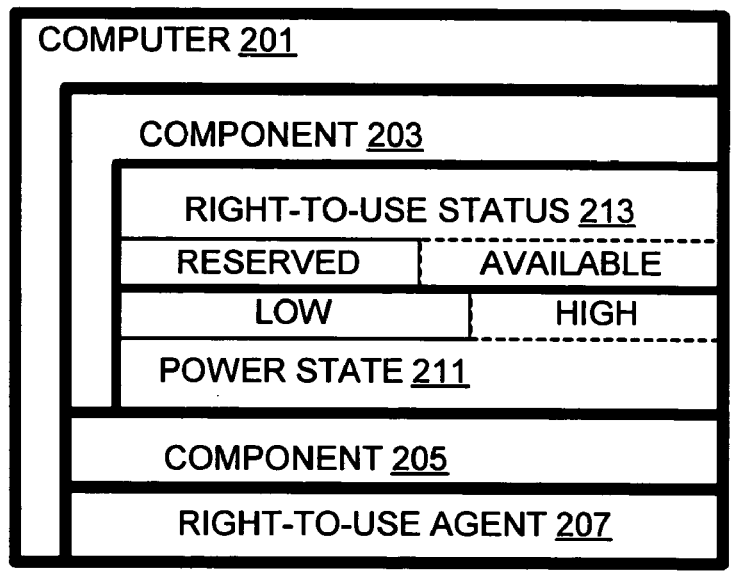
FIG. 2 is a block diagram of a computer in accordance with a second embodiment of the invention.

In a second embodiment of the invention as shown in FIG. 2, a computer 201 has a hardware components 203 and 205, and a right-to-use agent 207. Component 203 has a power state 211 that can be high or low. Right-to-use agent 207 assigns a status 213 to component 203; status 213 can be "reserved" or "available".

Figure 3:
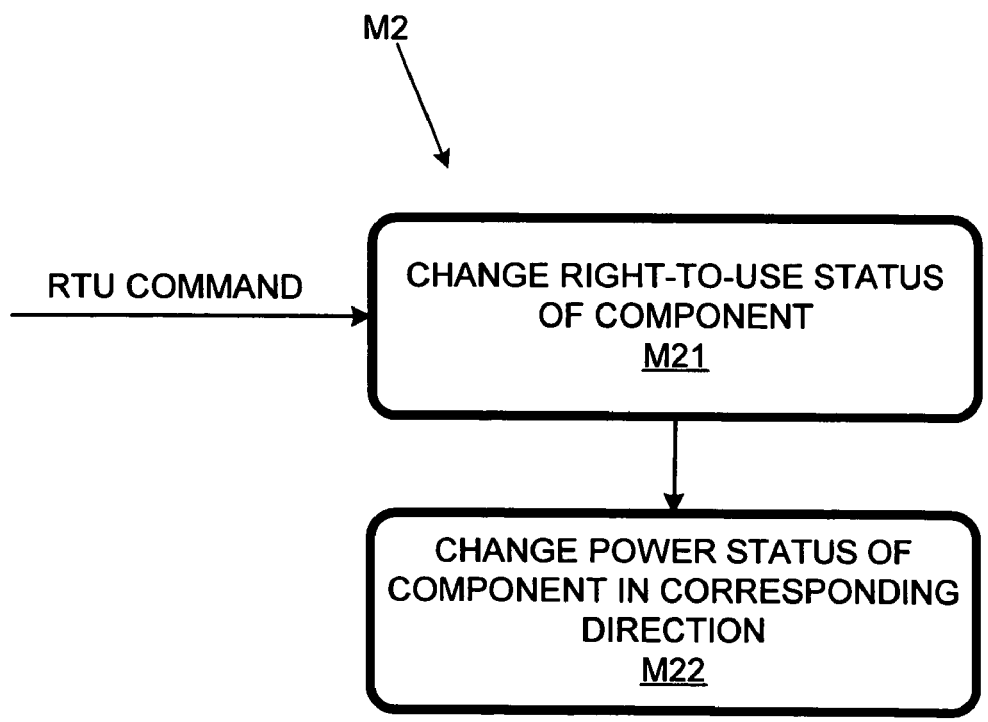
FIG. 3 is a flow chart of a method in accordance with a third embodiment of the invention.

In an associated method embodiment of the invention as shown in FIG. 3, a method M2 has method segments M21 and M22. In method segment M21, a right-to-use agent responds to a right-to-use command by changing the right-to-use status of a component. In method segment M22, the power state of the component is changed in a direction that corresponds to the direction of the right-to-use status change. More specifically, a right-to-use status change from reserved to available results in a power state change from low to high; while a right-to-use status change from available to reserved results in a power state change from high to low. A combination of available status and low power state can occur more than momentarily when the power state is set to low for some reason other than right-to-use status, e.g., in response to an extended period of low utilization while in the high power state.

The present invention provides for significant reductions in power consumption when processors are not performing work on behalf of the customer. This is achieved without manual action by the customer and without regard to usage and so without waiting for utilization monitor 33 to make a utilization determination. On the other hand, all the options available for controlling performance-versus-power for active processors are retained. Concomitantly, the invention allows a reduction in cooling capacity because reserve processors are generating less heat as a result of running at lower power settings. The reductions are achieved automatically, obviating the need for operator intervention. All this is achieved while permitting convenient online activations and deactivations. These advantages are realized in the context of the following vendor-specific example.

Hewlett-Packard Company (HP) markets enterprise servers with the option to include "reserve" hardware components such as processors—these processors are inactive, but available for temporary use or future purchase. An example of such option is Hewlett-Packard's (HP) "Instant Capacity" (iCAP) program, described in HP Instant Capacity User's Guide For Versions B.07.x, $2^{nd}$ edition, Hewlett-Packard Development Company, September 2005. One or more iCAP processor can be configured and installed on an HP server; the customer pays a fraction of the price of the processor for the right to have the processor configured in the system but not the right to use it. When there is a need for additional processor capacity the customer can buy the right to use the iCAP processor permanently or temporarily (TiCAP).

This invention takes advantage of "power states" available with modern processors, such as Montecito (available as an Itanium processor from Intel Corporation), to reduce the power consumption of an inactive processor. Given that many enterprises are relying on the flexibility provided by instant-capacity programs, the power consumption associated with inactive processor reserves can be significant. This invention significantly reduces this expense by turning power down while the processor is inactive.

Some "capacity-on-demand" programs reboot in order to activate a reserve resource. The most advanced ones do activations/deactivations online. Accordingly, the processor needs to be in "warm" state, known to the operating system, but not able to run user applications. The present invention provides power controls to reduce the power and cooling specifications for reserve processors.

The software RTU agent supplied with the operating system is responsible for providing operations to activate/deactivate processors, as well as for maintaining compliance with the desired state of active/inactive processors and providing status information. The RTU agent has the ability to change the power state of each reserve processor on the system. Agent operations, such as processor activation and deactivation, also change the power state of the processor. Here are the most typical cases. 1) System configuration from factory: all inactive processors have been configured to have temporary activation of a processor: power state is reset to the normal value the fully available processors have; this is done automatically as part of the activation. 2) Temporary deactivation of a processor: the power state is set back to a lower power state, so as to leave the inactive processor consuming minimal amount of power. 3) Permanent activation: power state is reset to that of the active processors; this is done automatically as part of the permanent activation.

Herein, a "computer" is a machine that manipulates data in accordance with a program of instructions. A "power state" of a computer or computer component is a setting that affects the level of power consumption by that component. A "right-to-use" status is a contractually defined status that determines entitlement to use capabilities of components.

The present invention applies in the contexts of variations of the right-to-use limitations business models. In the foregoing example, the reserved components are owned by the vendor but located within a system owned by the customer. Alternatively, the model can provide for customer ownership of reserved components, still subject to the right-to-use limitation. Note also that power conservation is not limited to processors, but can apply to memory modules and I/O devices as well. These and other modifications to and variations upon the illustrated embodiment are provided for by the present invention, the scope of which is defined by the appended claims.

What is claimed is:

1. A computer-implemented limited right-to-use business method comprising:
in response to a command to change the right-to-use status of at least one computer component, a computer:
changing the right-to-use status of said component in a direction either from reserved to available or from available to reserved, said component including at least one of a processor, a memory module, or an I/O device; and
changing a power state of said component from a non-off relatively low-power state of said component to a non-off relatively high-power state without rebooting said operating system after said command is received.

2. A method as recited in claim 1 further comprising, before changing said right-to-use status, initializing a computer system having both available and reserved components as defined by right-to-use limitations, said initializing involving booting an operating system with both available and reserved components in a relatively high-power high-performance state, and then setting said reserved components to a relatively low-power non-off state, said components including said at least one component.

3. A method as recited in claim 1 wherein said power state is changed from said relatively low-power state to said relatively high-power state in the event said status is changed from reserved to available, said power state being changed from said relatively high-power state to said relatively low-power state in the event said status is changed from available to reserved.

4. A method as recited in claim 1 wherein said component is a processor, said relatively high-power state is a C0 state, and said relatively low-power state is a C1, C2, or C3 state.

5. A method as recited in claim 4 wherein said processor has reserved status and is set to said C3 state during initialization, is changed to available status and set to said C0 state in response to a temporary activation, and is changed to reserved status and said C1 or said C2 state upon deactivation.

6. A computer comprising:
hardware components, including a first component having a high-power state and a low-power state, said first component including at least one of a processor, a memory module, or an I/O device; and
a right-to-use agent configured to respond to a command to change the right-to-use status of said first component by:
changing the right-to-use status of said component in a direction either from reserved to available or from available to reserved, and
changing the power state of said first component between a non-off relatively low-power state to a non-off relatively high-power state without rebooting said operating system after said command is received.

7. A computer as recited in claim 6 further comprising a boot sequencer for, while said first component has reserved status, initializing said components to a relatively high-power state, and then setting said first component to a relatively low-power non-off state.

8. A computer as recited in claim 6 wherein said power state is changed from said relatively low-power state to said relatively high-power state in the event said status is changed from reserved to available, said power state being changed from said relatively high-power state to said relatively low-power state in the event said status is changed from available to reserved.

9. A computer as recited in claim 8 wherein said first component is a processor, said relatively high-power state is a C0 state, and said relatively low-power state is a C1 or a C2 state.

10. A computer as recited in claim 9 wherein said processor has reserved status and is set to said C3 state during initialization, is changed to available status and set to said C0 state in response to a temporary activation, and is changed to reserved status and said C1 or said C2 state upon deactivation.

11. A computer product comprising non-transitory tangible computer-readable storage media encoded with code configured to, when executed by a processor, cause a right-to-use agent to, in response to a command to change the right-to-use status of at least a first computer component:
change the right-to-use status of said first component in a direction either from reserved to available or from available to reserved, and
change the power state of said first component between a non-off relatively high-power state to a non-off relatively low-power state without rebooting said operating system after said command is received, said first component including at least one of a processor, a memory module, or an I/O device.

12. A computer product as recited in claim 11 wherein said power state is changed from said relatively low-power state to said relatively high-power state in the event said status is changed from reserved to available, said power state being changed from said relatively high-power state to said relatively low-power state in the event said status is changed from available to reserved.

13. A computer product as recited in claim 11 wherein said first component is a processor, said relatively high-power state is a C0 state, and said relatively low-power state is a C1 or a C2 state.

14. A computer product as recited in claim 13 wherein said processor has reserved status and is set to said C3 state during initialization, is changed to available status and set to said C0 state in response to a temporary activation, and is changed to reserved status and said C1 or said C2 state upon deactivation.

* * * * *